Jan. 4, 1966  L. O. UPTON  3,227,032
ENERGY CONDUCTING FIBERS FORMED OF
SAPPHIRE CLADDED WITH QUARTZ
Filed March 30, 1961
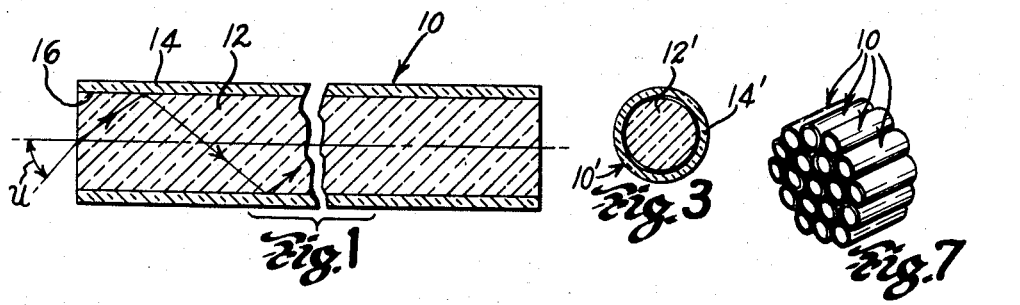
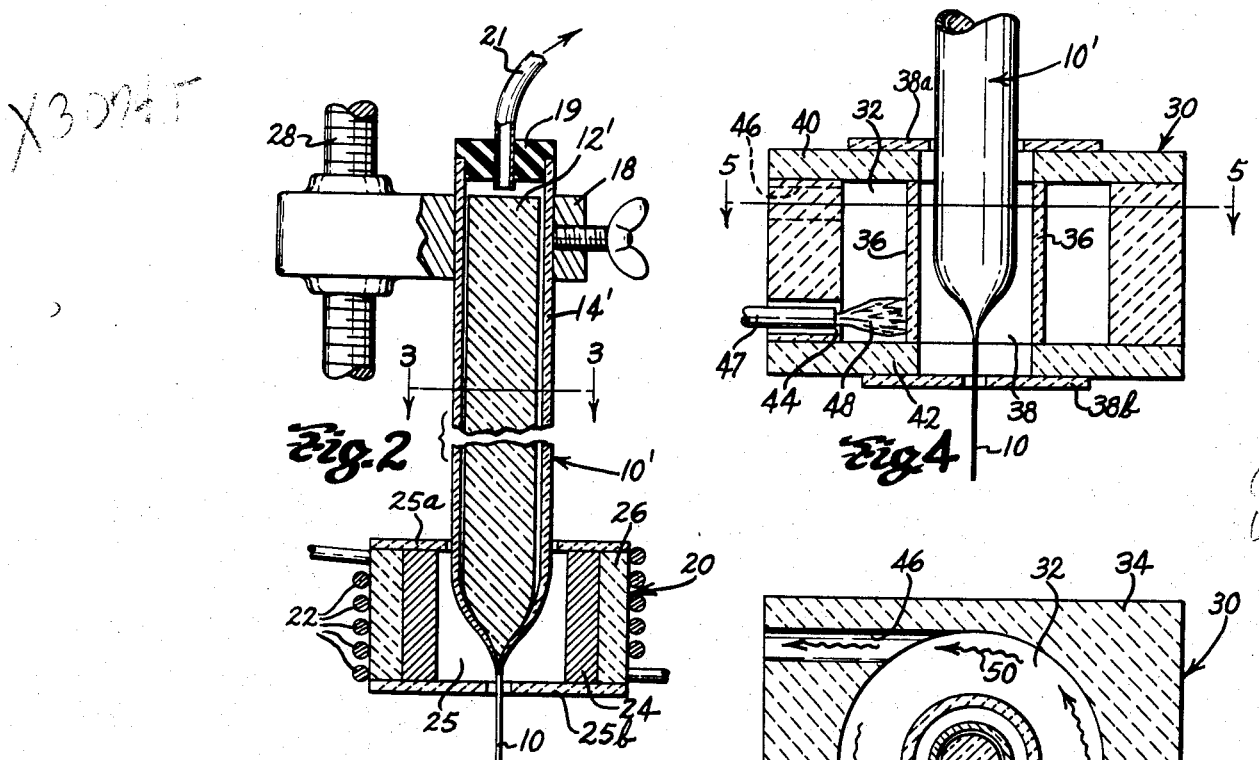
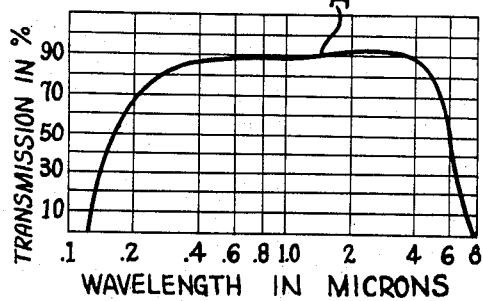
INVENTOR
LEE O. UPTON
BY
*Louis L. Gagnon*
ATTORNEY 3,227,032
ENERGY CONDUCTING FIBERS FORMED OF SAPPHIRE CLADDED WITH QUARTZ
Lee O. Upton, Sturbridge, Mass., assignor to American Optical Company, Southbridge, Mass., a voluntary association of Massachusetts
Filed Mar. 30, 1961, Ser. No. 99,457
3 Claims. (Cl. 88—1)

This invention relates to fiber-like energy-conducting elements and method of making the same and has particular reference to the provision of fiber optical elements having improved physical, chemical and optical properties.

Conventional fiber making materials such as glass or plastics or the like are, in general, only efficiently transmissive to electromagnetic radiations within and/or near the visible portion of the electromagnetic spectrum. While special glasses may be used to produce fibers which are relatively efficiently transmissive to radiations in other selected portions of the spectrum, the resultant fibers are usually relatively poorly transmissive to radiations outside said selected portions and are further handicapped by other accompanying factors such as low refractoriness and relatively poor resistance to chemical attack and/or abrasion. Thus, from the standpoint of transparency to electromagnetic radiations, it can be seen that conventional optical fibers have a limited usefulness. Furthermore, glass or other commonly used fiber making materials have what will be considered herein to be a relatively low refractoriness with melting temperatures generally in or around 1200 to 1600 degrees Fahrenheit and considerably lower in cases where special glass compositions are used for producing fibers which are transmissive to radiations in portions of the spectrum extending outside the visible region thereof. Low refractoriness is undesirable in the fiber optical field since it prevents the use of fiber optical devices in applications where such devices normally would have to be exposed to relatively high temperatures such as those approaching or beyond the melting points of most glasses.

Over and above the foregoing, the usual fiber making materials such as glasses or the like are subject to attack in one way or another by acids, alkalies and/or other chemicals and their properties of brittleness, strength, abrasion resistance and resistance to thermal shock are such as to leave much to be desired in the endeavor to achieve the utmost in optical fibers.

Accordingly, it is a principal object of the invention to provide an improved energy-conducting fiber-like structure which is highly transparent to radiation frequencies throughout and extending far to each side of the visible portion of the electromagnetic spectrum and which has exceptionally high refractoriness, thermal shock resistance and strength while being substantially chemically inert.

More specifically, another object is to provide a fiber structure having an axial transmission of approximately 50% and greater throughout a range of wavelengths in the electromagnetic spectrum of from approximately .175 micron to approximately 6 microns.

Another object is to provide a fiber structure of the above character embodying an energy conducting core part formed of highly refractory material having a relatively high index of refraction and a surrounding integrally related relatively thin energy-insulating cladding also formed of highly refractory material but having a relatively low index of refraction.

A further object is to construct a fiber of the above character of cladding and core materials which are further selected to have such relative expansion characteristics as to enhance the strength of the resultant fiber by placing the cladding part thereof under compression.

A still further object is to provide a clad energy conducting optical fiber having a core section formed of synthetic sapphire or fused alumina ($Al_2O_3$) surrounded by a cladding of fused silica ($SiO_2$) and method of making the same.

Other objects and advantages of the invention will become apparent from the following description when taken in conjunction with the accompanying drawings in which:

FIG. 1 is a greatly enlarged longitudinal cross-sectional view of a fiber element formed in accordance with this invention;

FIG. 2 is a diagrammatical illustration of apparatus and method used to form such fiber elements;

FIG. 3 is a cross-sectional view taken along line 3—3 of FIG. 2;

FIG. 4 is a view illustrating a modification of the apparatus shown in FIG. 2;

FIG. 5 is a cross-section taken along line 5—5 of FIG. 4 looking in the direction indicated by the arrows.

FIG. 6 is a graphical representation illustrating the approximate transmission characteristics of synthetic sapphire; and FIG. 7 is a view, in perspective, illustrating a plurality of the fiber elements of the invention arranged in intimately bundled relation with each other.

Referring more particularly to the drawings, it will be seen that the fiber element 10 (FIG. 1) which is formed in accordance with this invention embodies the usual two-part type of structure which comprises an energy-transmitting core 12 and an integral, relatively thin cladding 14 of energy-insulating material surrounding said core and fused thereto.

Unconventionally, however, the core 12 is formed of synthetic sapphire or fused alumina having indices of refraction to radiations whose direction of vibration is perpendicular to the long axis of the fiber of approximately from 1.69 at radiations having wavelengths of approximately 3.5 microns to 1.83 at radiations having wavelengths of approximately .28 micron. The cladding 14 is formed of optical quality fused silica (commonly referred to as fused quartz) having indices of refraction of from approximately 1.40 to 1.49 for wavelengths within the above mentioned wavelength ranges of from 3.5 microns to .28 micron. The cladding 14 is preferably of a thickness approximately equal to $\frac{1}{10}$ the overall thickness of the fiber 10. Electromagnetic radiations passing into one end of the core 12 of the fiber 10 from directions or along paths within its maximum aperture or acceptance angle $\mu$ (see FIG. 1) will be substantially totally internally reflected adjacent the interface 16 and in this manner, continue to pass on through the full length of the core 14.

Where $N_1$ is the index of refraction of the material of the core 12 and $N_2$ is the index of refraction of the cladding 14, the angle $\mu$ may be determined from the formula $\sin \mu = \sqrt{n_1^2 - n_2^2}$. Thus, for the fiber 10 which has the above-mentioned related core and cladding indices within the wavelength ranges given, its aperture angle $\mu$ would vary from approximately 35° to energy radiations of the longer wavelengths to an angle of at least 90° to radiations of the longer wavelengths.

Referring more particularly to FIG. 6 wherein there is shown graphically the approximate transmission characteristics of the synthetic sapphire which makes up the core 12, it will be seen that the fiber 10 will have a transmission through its core part 12 of approximately 50% and greater to electromagnetic radiations of wavelengths ranging from approximately .175 micron to approximately 6 microns and a transmission of between 80% and greater than 90% throughout the major portion of this range in the spectrum. Thus, the fiber 10 is highly transparent to radiations in the ultra-violet, visible and infra-red regions of the spectrum rendering it readily universally adaptable to uses requiring the transfer of radiations having wavelengths corresponding to those in any one or all of the above areas of said regions.

Over and above the unique transmission capabilities of the fiber 10, its core and cladding parts are characteristically highly resistant to abrasion, they are chemically inert and provide a fiber structure having exceptional mechanical strength. Furthermore, with a characteristic melting temperature of approximately 3722° Fahrenheit for the core material 12 and approximately 4000° Fahrenheit for the cladding material 14, the resultant high refractoriness of the fiber 10 renders it ideally suitable for use under temperatures elevated far beyond those withstandable by conventional optical fiber-making materials.

In the manufacture of the fiber 10 its core material is initially formed by conventional flame fusion techniques wherein an elongated rod-like synthetic sapphire boule is formed by dispensing aluminum oxide powder ($Al_2O_3$) through the center tube of an oxyhydrogen blowpipe enclosed in a ceramic lined furnace. A seed rod embodying a very small sapphire crystal is arranged to receive the alumina powder which is sprinkled thereon and fired by the blowpipe at approximately 2045° C. The fired aluminum oxide ($Al_2O_3$) fuses to the seed rod and as the seed rod is slowly withdrawn from the furnace while the powder is continuously dispensed and fired thereon, a long clear slender rod or boule of sapphire is grown. After removal from the growing furnace, the boule is reannealed by firing in a high temperature furnace producing annealing temperatures reaching in or around 1950° C. This annealing relieves stresses in the boule and permits it to be sawed, ground or lapped to a desired shape and size without fracture.

The sapphire boule is, in accordance with this invention, next ground and optically polished to a rod-like configuration having a substantially uniform cross-sectional dimension throughout its length. This is accomplished by conventional centerless diamond grinding techniques or other methods commonly used and well known in the art of cutting, grinding and polishing synthetic sapphire. Such a ground and polished sapphire rod which is to become the core part 12 of fiber 10, is illustrated by the reference numeral 12' in FIGS. 2 and 3.

While synthetic sapphire boules are commercially grown to various sizes and shapes, a boule of a size suitable to permit the forming of a rod 12' having a uniform diameter of approximately 1/8 to 3/16 inch and a length of approximately 12 inches would be desirable in the present instance. The rod 12', however, may be of any other conveniently workable size.

A fused silica tube 14' of optical quality and which is to ultimately become the cladding part 14 of the fiber 10 is next provided to complete the assembly 10' (FIGS. 1 and 2) from which the fiber 10 is formed as will be subsequently described.

Fused silica tubes of optical quality and having fire-polished inner walls are commercially available in various sizes and wall thicknesses. The tube 14' is selected to have an inner dimension such as to preferably loosely receive the sapphire rod 12' as shown in FIGS. 2 and 3 and is further selected to have a uniform wall thickness throughout its length which is such as to ultimately provide the fiber 10 preferably with the above-mentioned cladding thickness of approximately 1/10 the overall diametrical dimension of the fiber 10. While the tube 14' should be relatively thin as described, the above dimensions are arbitrary and have been given for purposes of illustration only.

It is pointed out that the relative rod 12' and tube 14' thickness dimensions will determine the ratio of thicknesses of the ultimate core 12 and cladding 14 of the fiber 10. No substantial departure from the initial ratio of thicknesses of the parts 12' and 14' will result from attenuation of the assembly 10' during the drawing of a fiber therefrom.

In preparing to form the fiber 10 from the respective rod and tube parts 12' and 14' and the rod 12' is placed internally of the tube 14' and one end of the tube 14' is heat sealed with an oxyhydrogen flame or the like. The assembly 10' is then suspended from a suitable supporting clamp or the like 18 with its heat sealed end depending and a stopper 19 is placed in the opposite open end of the tube 14' to render the assembly substantially air tight.

Through the stopper 19 there is extended a suction line 21 which, in turn, is connected to a conventional suction pump or the like (not shown) for the purpose of producing a vacuum effect between the rod and tube parts 12' and 14' which acts to evacuate air and/or gases from the spacings therebetween. The suction further causes a collapsing of the tube part 14' firmly against the rod part 12' when the assembly is heated to a fiber drawing viscosity as will be described. A suction approximately equivalent to that which will support a 25-inch water column will produce satisfactory results with an assembly 10' of the character set forth above by way of example.

In view of the characteristic high refractoriness of the tube 12' and rod 14' parts, the assembly 10' must be heated by means capable of producing temperatures within the working range of the fused silica tube 14' which, as mentioned above, has a melting temperature somewhat higher than that of the synthetic sapphire rod 12'. This working range would be approximately from 3700° F. to 4500° F. A drawing temperature of approximately 4000° F. is preferred.

In one aspect of the invention which is illustarted in FIG. 2, a ring-like heating furnace 20 is provided through which the assembly 10' is passed axially to zone heat the same progressively along its length to a fiber drawing viscosity. The heating furnace 20 embodies an electrical high frequency induction coil 22 and a tubular susceptor 24 which is spaced from the coil high up frequency insulating material 26. In view of the high temperature of approximately 4000° F. which is required to render the assembly 10' suitably fluid for fiber drawing, the susceptor 24 is preferably constructed of graphite or a similarly characterized material capable of being heated to and withstanding the above-mentioned high temperatures. The high frequency insulating material which, likewise, must withstand the high fiber drawing temperature is preferably formed of a conventional furnace refractory material such as, for example, zirconia, tin oxide or others of a similar nature. The oppoiste ends of the heating chamber 25 formed by the encircling susceptor 25 are provided with refractory covers 25a and 25b (see FIG. 2) having openings proportioned to allow the assembly 10' and fiber 10 to pass freely therethrough as shown. This prevents an updraft through the chamber 25 and assists in maintaining a uniform temperature therein.

In operation, the coil 22 being connected to and energized by a conventional high frequency generator (not shown) causes the susceptor 24 to become heated and thus produce the required heat in the chamber 25 encircled thereby and into which the assembly 10' is slowly lowered axially by means of a lead screw 28 threaded through the clamp and driven at a constant controlled rate.

In drawing the fiber 10 the depending end of the assembly 10' is first directed into chamber 25 of the furnace 20. When heated to a fiber drawing viscosity, the assembly 10' is gripped and drawn axially through the opening in the cover 25b at a relatively rapid rate controlled in accordance with the relatively slow rate at which the assembly 10' is lowered to produce the fiber 10 having a desired cross-sectional size. Fibers 10 ranging in sizes from many thousandths of an inch or larger in diameter to only fractions of a thousandths of an inch may be formed by proper control of the related factors of drawings rate, rate of lowering of said assembly and the viscosity of the assembly 10' as determined by temperature applied thereto in the heating zone or chamber 25 of the furnace 20. As an example, at a drawing temperature of approximately 4000° F. a fiber 10 having a diameter of approximately .002 inch may be formed from a ⅛ inch diameter assembly 10' by drawing said assembly 10' at a rate of approximately 500 ft./minute when said assembly 10' is lowered into the furnace 20 at a rate of approximately 1.2 inches/minute. In general, the rate of removal of material from a heated assembly such as 10' determines the resultant fiber size. That is, at a given viscosity the faster drawing rates produce the smaller fibers and vice versa.

It is pointed out that the resultant fiber 10 will, in all cases and regardless of size, have substantially the same related core 12 to cladding 14 thicknesses as those of the respective like parts 12' and 14' of the initial assembly 10'. Furthermore, during the drawing operation, the vacuum produced by suction line 21 will continuously withdraw existing air and/or gases from between the tube 14' and rod 12' to produce a clean substantially bubble-free fused joinder between the resultant core 12 and cladding 14 parts of the drawn fiber 10. Also, the effect of the vacuum will tend to pull the material of the tube part 14' firmly inwardly against the rod part 12' adjacent the heated area thereof to assist, along with the attenuated action of drawing, in assuring a secure and positive uninterrupted fusion throughout the lentgh of the fiber 10.

In view of the fact that the synthetic sapphire core material of the fiber 10 characteristically has a coefficient of expansion of approximately $7.7 \times 10^{-6}$/degree centigrade and the fused silica cladding material of the fiber 10 has an expansion coefficient of approximately $0.5 \times 10^{-6}$/degree centigrade, it can be seen that the relative differences of expansion of the core and cladding materials being higher in the core part of the fiber will place said cladding part 14 under compression to enhance the strength of the fiber 10. In view of the relative thinness of the cladding 14, separation or cracking or other interfacial difficulties which might be expected to result from materials having such differences in expansion are avoided.

The fiber 10, after having been drawn, may be cut to predetermined lengths which may be used separately as energy transferring means or alternatively bundled together as shown in FIG. 7 to produce a composite energy-transferring device. The cut lengths of fibers 10 may be held together with cement or other binding means or their cladding 14 may be joined by fusion. In instances where the composite energy transferring devices are to be subjected to heat when in use, the fibers 10 would be joined together by fusion.

As an alternative to the use of the high frequency induction furnace 20, a flame heated furance 30 such as shown diagrammatically in FIGS. 4 and 5 may be used to heat the assembly 10' to a fiber drawing viscosity.

The furnace 30 embodies an annular combustion chamber 32 formed in a block 34 of furnace refractory capable of withstanding temperatures well above those required to render the assembly 10' suitably fluid for drawing. The block 34 may comprise a fabrication of a plurality of pieces of refractory material if such a construction is desired and the inner wall or tubular muffle 36 of the combustion chamber is also preferably formed of a highly refractory material. Zirconia, tin oxide or other well known refractories may be used in the fabrication of the furnace 30. The upper and lower ends of the chamber 32 are closed by refractory blocks 40 and 42 and a tangential burner opening 44 is provided adjacent the lowermost end of the chamber 32. An oxyhydrogen burner 47 is placed in the opening 44 and an exhaust opening 46 is provided to extend tangentially outwardly from the chamber 32 adjacent its uppermost end.

When in operation, heat produced by the burner flame 48 is caused to encircle the muffle 36 as shown by the arrows 50 thereby heating the muffle 36 relatively uniformly about its circumference which, in turn, heats the area 38 encircled by the muffle 36. The assembly 10 is directed into the heated area 38 and the fiber 10 is drawn therefrom in the manner described above with relation to FIG. 2. Covers 38a and 38b, like covers 25a and 25b in FIG. 2, are provided to prevent an updraft through the area 38. It can be seen in FIGS. 4 and 5 that the burner flame 48 only heats the muffle 36 and does not impinge upon the assembly 10' which passes axially therethrough. In this way, no foreign matter such as carbonaceous particles or the like issued from the flame 48 are permitted to contaminate the softened outer surface of the assembly 10. Dust or other particulate matter which might enter the heated areas of either of the furnaces 20 or 30 adjacent the assembly 10' will burn off at the fiber drawing temperatures produced therein and a clean fiber 10 will result.

From the above, it can be seen that the resultant fiber 10 has superior optical, physical and chemical properties. Optically, for example, its core section 12 will efficiently transmit light or electromagnetic radiations of wavelengths extending throughout the complete visible portions of the spectrum and far to each side thereof into the ultra-violet and infra-red as shown graphically by the curve A in FIG. 6. The fiber 10 is inherently chemically inert and by way of example, some of the physical properties of the synthetic sapphire core part 12 are substantially as follows:

Young's modulus (p.s.i.) _____ $50-56 \times 10^6$.
Modulus of rigidity (p.s.i.) _____ $21-26 \times 10^6$.
Modulus of rupture (p.s.i.) _____ $65-100 \times 10^3$.
Specific gravity _____ 3.98.
Hardness _____ Moh 9, Knoop number 1525–2000.

It should be understood that while the foregoing has provided means and method for accomplishing all of the objects and advantages of the invention, certain changes in the details of construction, arrangement of parts and steps in the method may be made by those skilled in the art without departing from the spirit of the invention as expressed in the accompanying claims. Therefore, the invention is not to be limited to the exact matters shown and described as only preferred matters have been given by way of illustration.

Having described my invention, I claim:

1. An energy conducting fiber comprising the fused together and drawn combination of a long and thin core part of synthetic sapphire of one refractive index surrounded by a relatively thin cladding of fused quartz of a lower refractive index.

2. An image-conducting structure comprising a multiplicity of energy-conducting fibers bundled together in side-by-side substantially parallel relationship with each other, said fibers each comprising the fused together and drawn combination of a long and thin core part of synthetic sapphire of one refractive index surrounded by a relatively thin cladding of fused quartz of a lower refractive index.

3. An image-conducting structure according to claim 2 wherein said fibers are fused together as a unit throughout at least a substantial portion of their lengths.

References Cited by the Examiner

UNITED STATES PATENTS

| | | | |
|---|---|---|---|
| 2,313,296 | 3/1943 | Lamesch | 49 |
| 2,448,511 | 9/1948 | Barnes et al. | |
| 2,484,003 | 10/1949 | Simison | 49 |

(Other references on following page)

UNITED STATES PATENTS

| | | | |
|---|---|---|---|
| 2,608,772 | 9/1952 | Stuetzer | 49 |
| 2,825,260 | 3/1958 | O'Brien | 88—1 |
| 2,992,516 | 7/1961 | Norton | 49 |
| 2,992,517 | 7/1961 | Hicks | 49—89 |
| 2,992,586 | 7/1961 | Upton | 49 |
| 2,992,587 | 7/1961 | Hicks et al. | 88—1 |
| 2,992,956 | 7/1961 | Bazinet | 49 |
| 3,004,368 | 10/1961 | Hicks | 49—89 |
| 3,010,357 | 11/1961 | Hirschowitz | 88—1 |
| 3,051,038 | 8/1962 | Duke | 88—1 X |
| 3,141,106 | 7/1964 | Kapany | 88—1 X |

JEWELL H. PEDERSEN, *Primary Examiner.*

ARTHUR KENT, JOHN K. CORBIN, *Examiners.*